United States Patent
Hou et al.

(10) Patent No.: US 11,979,821 B2
(45) Date of Patent: May 7, 2024

(54) MULTITENANT NETWORK DEVICE MANAGEMENT

(71) Applicant: Hewlett Packard Enterprise Development LP, Houston, TX (US)

(72) Inventors: Yi Hou, Beijing (CN); Jiabao Jin, Beijing (CN); Wei Li, Beijing (CN); Chunfeng Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 413 days.

(21) Appl. No.: 17/599,689

(22) PCT Filed: Apr. 26, 2019

(86) PCT No.: PCT/CN2019/084563
§ 371 (c)(1),
(2) Date: Sep. 29, 2021

(87) PCT Pub. No.: WO2020/215317
PCT Pub. Date: Oct. 29, 2020

(65) Prior Publication Data
US 2022/0201598 A1     Jun. 23, 2022

(51) Int. Cl.
| | |
|---|---|
| H04W 48/16 | (2009.01) |
| H04W 28/16 | (2009.01) |
| H04W 48/02 | (2009.01) |
| H04W 48/08 | (2009.01) |
| H04W 88/08 | (2009.01) |

(52) U.S. Cl.
CPC .......... *H04W 48/16* (2013.01); *H04W 28/16* (2013.01); *H04W 48/02* (2013.01); *H04W 48/08* (2013.01); *H04W 88/08* (2013.01)

(58) Field of Classification Search
None
See application file for complete search history.

(56) References Cited

U.S. PATENT DOCUMENTS

| | | |
|---|---|---|
| 8,885,539 B2 | 11/2014 | Trudeau et al. |
| 9,356,939 B1 | 5/2016 | Gates et al. |
| | (Continued) | |

FOREIGN PATENT DOCUMENTS

| | | |
|---|---|---|
| CN | 105407045 A | 3/2016 |
| EP | 3032448 A1 | 6/2016 |

OTHER PUBLICATIONS

Guo et al., "ViFi: Virtualizing WLAN Using Commodity Hardware", Sep. 11, 2014, 13 pages.

(Continued)

*Primary Examiner* — Hong S Cho
(74) *Attorney, Agent, or Firm* — Hewlett Packard Enterprise Patent Department

(57) ABSTRACT

Example implementations relate to managing a resource of a network device. A resource of a network device may be assigned from a first tenant to a second tenant of the network device. Resources of the network device may include an assignment right, an access right, and a configuration right. By assigning the resource to the second tenant, the second tenant may be granted an access right to the assigned resource. Responsive to the assignment of the resource, an access right to the assigned resource may be removed from the first tenant such that the first tenant is isolated from the resource.

20 Claims, 7 Drawing Sheets

(56) References Cited

U.S. PATENT DOCUMENTS

| | | | |
|---|---|---|---|
| 10,305,881 B2* | 5/2019 | Volini | H04L 63/0807 |
| 10,616,225 B2* | 4/2020 | Gopu | G06F 21/10 |
| 2013/0094486 A1 | 4/2013 | Bhanage et al. | |
| 2014/0040973 A1 | 2/2014 | Posh | |
| 2014/0334336 A1 | 11/2014 | Chen et al. | |
| 2017/0011226 A1* | 1/2017 | Henderson | G06F 21/6218 |
| 2018/0007007 A1 | 1/2018 | Bansal et al. | |

OTHER PUBLICATIONS

International Search Report and Written Opinion received for PCT Application No. PCT/CN2019/084563, dated Feb. 6, 2020, 7 pages.
Jiang et al., "A Secure Multi-Tenant Framework for SDN", (SIN '16 Proceedings of the 9th International Conference on Security of Information and Networks, Jul. 20-22, 2016, 5 Pages.

* cited by examiner

MULTITENANT NETWORK DEVICE MANAGEMENT

BACKGROUND

A network device, e.g. a wireless access point, may be a device that acts as a central point between a wireless and a wired network. An access point may communicatively couple a computing device, such as a laptop, handheld device, desktop, or other wireless communication device, to a network via one or more wireless networking protocols. Access points may be distributed throughout an area for which wireless network access is desired such that a computing device within the area will generally be within range of an access point.

BRIEF DESCRIPTION OF THE DRAWINGS

Certain examples are described in the following detailed description and in reference to the drawings, in which.

DETAILED DESCRIPTION

Access points may include a number of hardware and/or software resources. These resources may include, but are not limited to, any number of; Ethernet ports; short wavelength, ultra-high frequency (UHF) wavelength (e.g. Bluetooth) radio; antennas and/or beacons; radio frequency channels (e.g. 2.4 gigahertz and 5 gigahertz channels); virtual access points (VAPs), Internet of Things (IoT) sensors, and/or any other hardware and/or software resources of the network device.

The resources above may be accessed and/or configured by a network device tenant. A tenant of a network device may be one with rights to configure and/or to otherwise access or monitor a resource of the network device. The configuration of a resource of an access point may include, but are not limited to; enabling or disabling the resource, setting up or changing a Service Set Identifier (SSID) of the resource; changing broadcast settings of the SSID, associating a Dynamic Host Configuration Protocol (DHCP) server with the resource, etc.

Hardware and software of a network device may be virtually divided into multiple parts, wherein each part may be represented as a resource. A resource "capability" as described herein, may refer to the right of a tenant to access; configure, assign, and/or revoke the resource. Thus; a tenant holding a resource capability, e.g. an Ethernet port capability, may have access, configuration, and/or assignment rights to that resource capability. Unlike a grant of a sub-account from an account holder, a tenant holding a resource capability may hold the resource capability in isolation, such that no other tenant having access to the network device may access, configure, assign, or otherwise monitor the resource capability. For example, data may be transmitted to a tenant holding a resource capability of a network device but not to other tenants of the network device. A tenant holding a resource capability may or may not have ownership over the hardware of the access point. In an example, a tenant may manage, i.e. access, configure and/or assign resources, of any number of network devices on a centralized platform.

Figure 1:
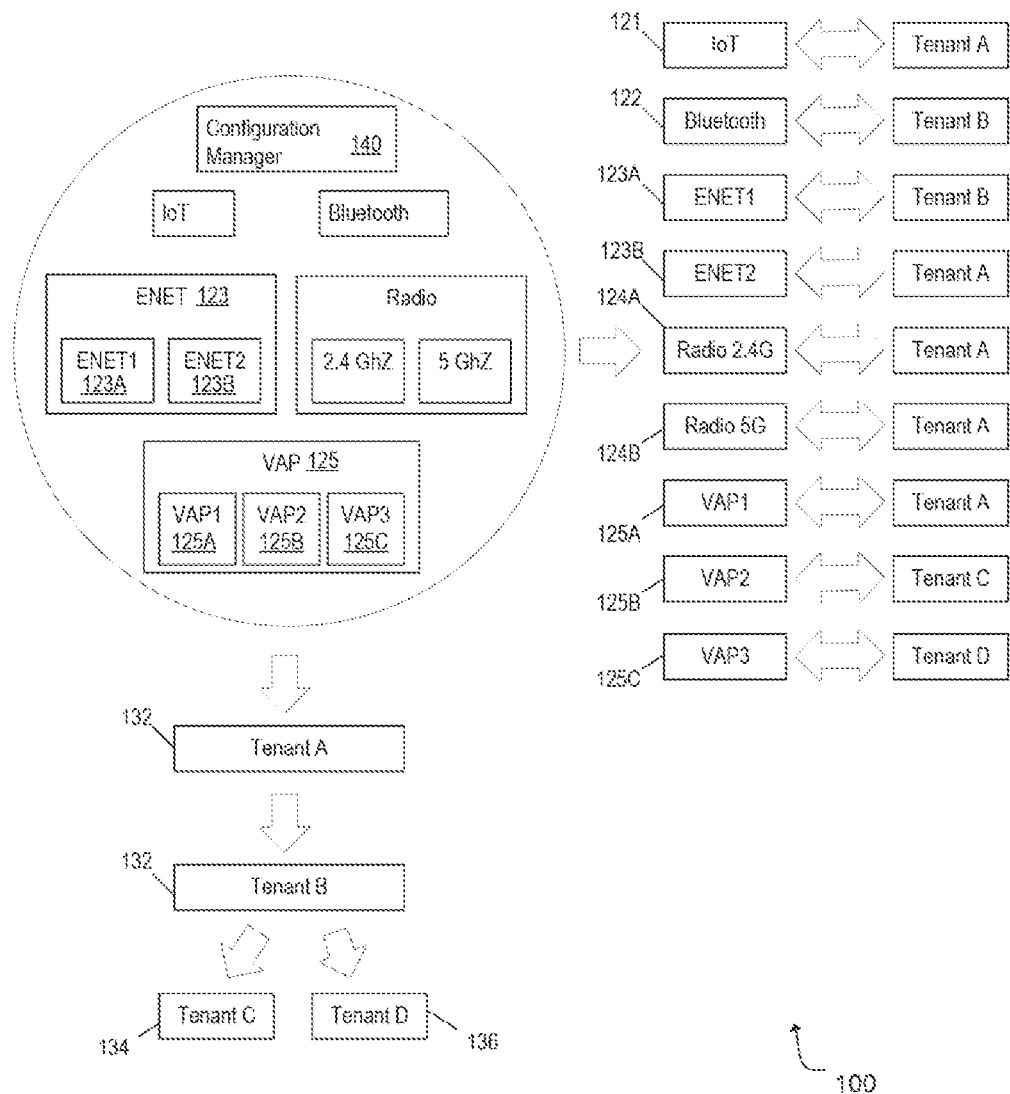
FIG. 1 is a block diagram illustrating an example network device virtually divided into a plurality of resources.

FIG. 1 is a block diagram illustrating an example network device 100, also referred to herein as an access point, having a plurality of example resources. Example resources include a short wavelength, ultra-high frequency (UHF) wavelength (e.g. Bluetooth) resource 122, that may include any number of radios, antennas and/or beacons, to enable UHF wavelength communication and/or data collection, Another example resource may include an IoT resource 121, that may include any number of IoT data sensors, and/or IoT communication capabilities. An IoT device, may be, for example, a computing device that may connect wirelessly to a network and may have any number of sensors for data collection, including the ability to wirelessly transmit the collected data. An IoT device may also be monitored and controlled wirelessly.

Another example resource of network device 100 may include example Ethernet resources 123, including a first Ethernet port 123A and a second Ethernet port 123B. Network device 100 may further include radio resources 124, which, in some example implementations, may include a dual band radio, including a 2.4 GhZ radio 124A and a 5 GhZ radio 124B. Network device 100 may include any number of channels for each radio. Network device 100 may also include a virtual access point (VAP) resource 125 having a plurality of example VAPS, including VAP1 125A, VAP2 125B, and VAP3 1250. A VAP is a logical wireless network, and may be a type of Virtual Local Area Network (VLAN). Each of VAP1 125A, VAP2 125B, and VAP3 1250, respectively, may be isolated from each other. For example, each VAP may have separate security policies, permissions, packet shaping settings, and/or IP network segments. While some example resources are illustrated at example FIG. 1, a network device may include any number of resources of different or like type.

A device owner may have ownership over hardware of a network device and thus may initially hold each resource capability of the network device. Users of the network device resource, e.g. those who rent resources of the network device, may be referred to herein as tenants. A tenant may be hold any number of resource capabilities of the network device; however, as will be described in greater detail below, any of these resource capabilities may be revoked by the assignor of the respective resource capabilities, which may or may not be the device owner.

As will be described in greater detail below with reference to FIG. 2, a tenant who holds a resource capability of a network device may have any number of rights to each of the example resources of network device 100, including an access right, configuration right, assignment right, a revocation right, and/or any other right for accessing or otherwise modifying a resource. Configuration manager 140 may log and otherwise enable the tenant holding a resource capability to exercise the capability. For example, Tenant A 132, who may or may not be the owner of the network device, may assign a resource capability, e.g. a capability to Bluetooth 122, and/or a capability to the first Ethernet port 123A to Tenant B 134.

This assigned resource capability may include an assignment right to the resource, such that Tenant B may assign the resource capability to Tenant C 134 or Tenant D 136, In an example, Tenant B 132 may assign a first resource capability to Tenant C 134 and a second resource capability to Tenant D 136, thus forming a tenancy chain. For example, Tenant A may assign a capability of VAP2 125B and a capability to VAP3 125O to Tenant B. If the assigned capability of VAP2 125B and VAP3 125O includes an assignment right, then Tenant B may subsequently assign, as an example, VAP2 125B to Tenant C and VAP3 to Tenant D.

In an example, Tenant A is isolated from the capabilities Tenant A assigns, i.e. no longer holds. For example, after Tenant A assigns a capability of a resource, e.g. Ethernet port 2 123B, to Tenant B, Tenant A may no longer access, configure, or otherwise modify Ethernet port 2 123B. In some examples, any data transmitted by the resource is transmitted to the capability holder, and not to the assignor of the resource. In this way, there is clear authority separation and information security between tenants having access to a like network device.

Figure 2:
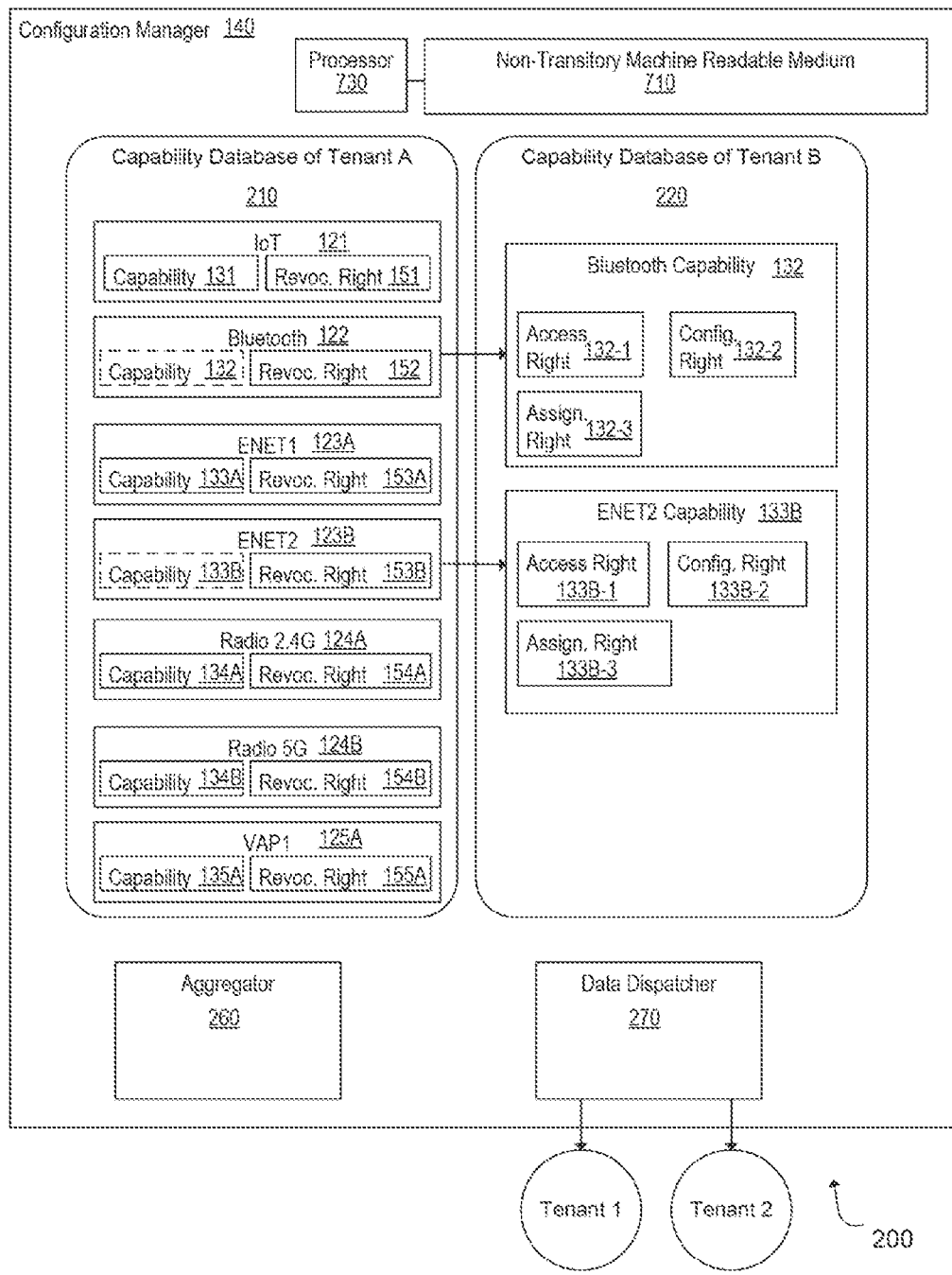
FIG. 2 is a block diagram illustrating an example configuration manager for management of network device resources.

FIG. 2 is a block diagram 200 illustrating an example configuration manager 140 for management of network device resources. The example configuration manager 140 of FIG. 2 may be integrated within the network device of FIG. 1, or may be included in a separate device from network device 100 such that configuration manager 140 manages resources of network device 100 remotely, i.e. over a network. Configuration manager 140 may be implemented by one or more engines which may be any combination of hardware and programming to implement the functionalities of the engine(s).

In examples described herein, such combinations of hardware and programming may be implemented in a number of different ways. For example, the programming for the engines may be processor executable instructions stored on at least one non-transitory machine readable medium 710 and the hardware for the engines may include at least one processing resource 730 to execute those instructions as will be described in greater detail below with respect to FIG. 7. In some examples, the hardware may also include other electronic circuitry to at least partially implement at least one of the engine(s). In some examples, the at least one machine readable medium, e.g. non-transitory machine readable medium 710, may store instructions that, when executed by the at least one processing resource 730, at least partially implement some or all of the engine(s).

Configuration manager 140 may include any number of capability databases. In some example implementations, configuration manager 140 may include a capability database for each tenant of a network device, e.g. network device 100 of FIG. 1. In some examples, configuration manager 140 may include a capability database for each tenant holding a resource capability of network device 100. In some example, a capability database may be created at configuration manager 140 for any new tenant of network device 100. For purposes of clarity and conciseness, two example capability databases, a capability database of Tenant A 210, and a capability database of Tenant B 220, are illustrated, however, any number of capability databases may be implemented. Each capability database is illustrated as local to configuration manager 140. However, in other example implementations, each capability database may be in communication with configuration manager 140 over a network, and, in some examples, may be hosted at a database, networking environment, and/or management portal of the tenant. Furthermore, in some example implementations, capability databases may be spread across multiple devices.

Capability database of Tenant A 210, and capability database of Tenant B 220, respectively, may record the resource capabilities held by each respective tenant. For example, Tenant A may hold capabilities to a number of resources of network device 100 of FIG. 1, and capability database of Tenant A 210 may maintain a log of each capability held by Tenant A. In this example, capability database of Tenant A 210 may include the following recorded capabilities of a network device, e.g. network device 100 of FIG. 1: IoT resource 121, Bluetooth resource 122, first Ethernet port 123A, second Ethernet port 123B, 2.4 GhZ radio 124A, 5 GhZ radio 124B, and VAP1 125A.

Each resource of capability database of Tenant A 210 may include a recorded capability of the resource, 131-135A respectively. Each recorded capability may include any number of rights to the respective resource, including an access right, configuration right, assignment right, and/or any other right to access and/or otherwise modify the resource. Each of these capabilities may be assignable. Each resource of capability database of Tenant A 210 may further include a revocation right, 151-155A, to each resource. In some example implementations, Tenant A is the owner of the hardware of network device 100, and therefore holds an unassignable revocation right to each assigned resource.

In some example implementations, the assignor of any resource capability may hold a revocation right to the assigned resource capability. Turning back to example FIG. 1 for reference, Tenant A 132 may assign a resource to Tenant B 132, who thereafter may assign a resource to Tenant C 134 and Tenant D 136. In this example scenario, Tenant B may hold a revocation right to the resources assigned to Tenant C 134 and Tenant D 136, and Tenant A may hold a revocation right to the resources assigned to Tenant B, including those resources that Tenant B has assigned, Thus, a revocation of a resource assigned from Tenant A to Tenant B may consequentially lead to a revocation of that resource where it also assigned to Tenant C 134 or Tenant D 136.

As illustrated in FIG. 2, capability 132 of Bluetooth resource 122, and capability 133B of Ethernet port 2 123B may be assigned to capability database of Tenant B 220. Capability 133B of Bluetooth resource 122 and capability 133B of Ethernet port 2 123B may each include a respective access right, 132-1 and 133B-1 respectively, configuration right, 132-2 and 133B-2 respectively, and assignment right 132-3 and 133B-3 respectively. Access right 132-3 and 133B-3 may grant the tenant access to the Bluetooth resource 122 and the Ethernet port 2 123B. Data from a resource may further be transmitted to the holder of the access right. For example, data dispatcher 270 may transfer data of a resource to an access right holder of the resource. In an example implementation, data dispatcher may determine which tenant the data should be sent to by searching each of capability database of Tenant A 210 and capability database of Tenant B 220.

Configuration right 132-2 of Bluetooth resource 122 and configuration right 133B-2 of Ethernet port 2 123B may enable a tenant to configure Bluetooth resource 122 and Ethernet port 2 123B respectively, e.g., enabling and/or disabling functions of the Bluetooth resource 122 and/or Ethernet port 2 123B, changing or otherwise associating a Service Set Identifier SSID, selecting a channel on which to broadcast, setting up a security protocol, and/or any other configuration process for personalizing or otherwise securing the resource of the network device. Aggregator 260 may, in an example, combine the various configurations of resources configured by Tenant A and Tenant B, and, push down to, or otherwise apply the combined configurations at a hardware layer of the network device. Thus, each tenant may enjoy isolated configurations of resources for which they hold a capability, and, these isolated configurations may be applied to the hardware of the network device via aggregator 260.

Although aggregator 260, data dispatcher 270, and capability database of Tenant A 210 and capability database of Tenant B 220 are illustrated as included within configuration manager 140 for purposes of clarity and conciseness, any of these respective components may be logically and/or physically separated, and/or otherwise included within separate hardware components, e.g. separate physical servers, that may be in communication with configuration manager 140 over a wired or wireless connection.

Assignment right 132-1 of Bluetooth resource 122 and assignment right 133B-3 of Ethernet port 2 123B enable the tenant holding the assignment right to assign the Bluetooth resource 122 and the Ethernet port 2 respectively, to a different tenant, e.g. Tenant C 134 or Tenant D 136 of FIG. 1, while still maintain rights to unassigned resources. In an example implementation, a tenant may assign a capability via a request on a user interface.

In an example implementation, capability database of Tenant A 210 may include a revocation right to each resource, 151-155A respectively. Specifically, Tenant A may be an owner of the network device, and may thus have ownership over each resource. While Tenant A may assign capabilities of each resource to other tenant assignees, and these tenant assignees may enjoy isolated access to these resources, Tenant A may maintain a right to revoke these resource assignments. For example, capability 132 of Bluetooth 122 has been assigned to Tenant B and has thus been recorded at capability database of Tenant B 220, Tenant A may, via capability database of Tenant A 210, revoke capability 132 of Bluetooth 122 from capability database of Tenant B 220. In an example implementation, each of revocation rights 151-155A may be unassignable.

Figure 3:
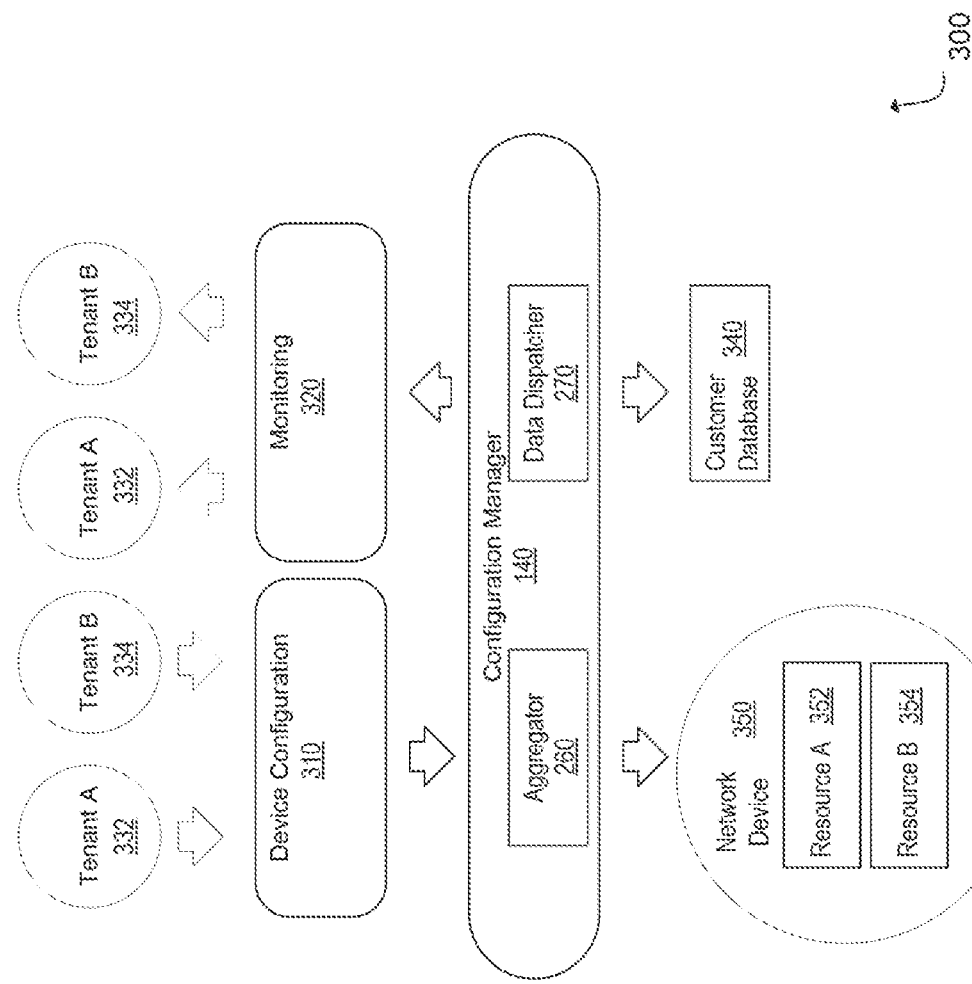
FIG. 3 is a flowchart illustrating an example process by which resources of a network device may be managed.

FIG. 3 is a flowchart illustrating a process 300 by which resources of a network device 350 may be managed. In this example, Tenant A 332 and Tenant B 334 may each hold a resource capability to different resources, e.g. resource A 352 and resource B 354 of network device 350 respectively. Tenant A 332 and Tenant B 334 may each configure their respective capability as shown at block 310. These configurations may be received by configuration manager 140, which may be similar to configuration 140 of FIG. 1 and FIG. 2. Aggregator 260 of configuration manager 140 may, as described above, combine the configurations to resource A 352 and the configurations to resource B 354 of Tenant B. Aggregator 260 may further apply the combined configuration to hardware of network device 350.

Example data dispatcher 270 of configuration manager 140 may further transmit data to a tenant holding an access capability to a resource, such that Tenant A 332 or Tenant B 334 may monitor 320 resource A 352 and resource B 354 respectively. As described above, data dispatcher 270 may search a data capability database to transmit, in isolation, the data of a resource to the capability holder of the resource. In an example implementation, data dispatcher 270 may transmit the data to a customer database 340 of Tenant A 332 or of Tenant B 334.

For example, a tenant may hold capabilities to resources that span multiple network devices. The tenant may manage these capabilities collectively at a customer database, and, in some examples, may set policies applicable across network devices to various resources whose associated capabilities are held by a respective tenant. In an example use case, a real estate owner may own various network devices at a retail space. A retailer may rent resources of any number of these network devices, and may be assigned capabilities to these resources. The retailer may access, configure, assign, or otherwise manage a collection of resources at the customer database, or specific network environment of the retailer. In this way, the retailer, the assignee tenant in this case, may manage resources of the retailer, as well as other remote resources rented by the retailer, in an account of the retailer.

Figure 4:
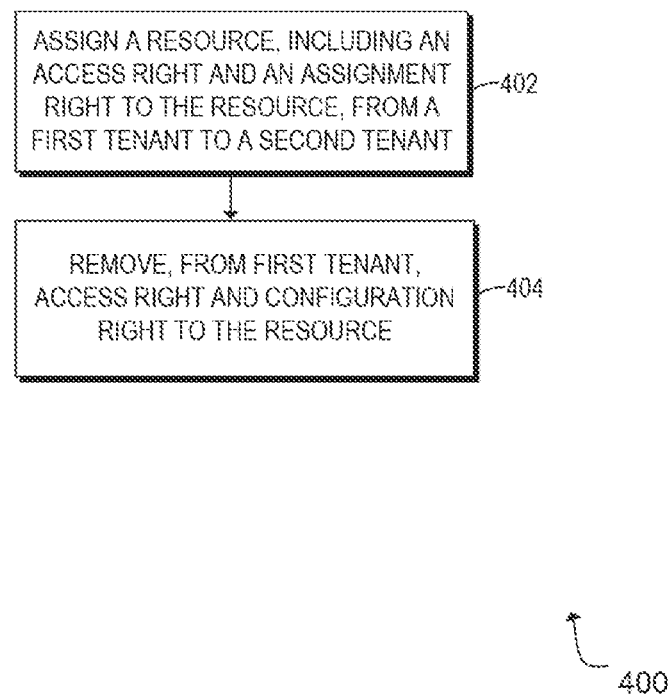
FIG. 4 is a flowchart illustrating an example method for managing resources of a network device.
Figure 5:
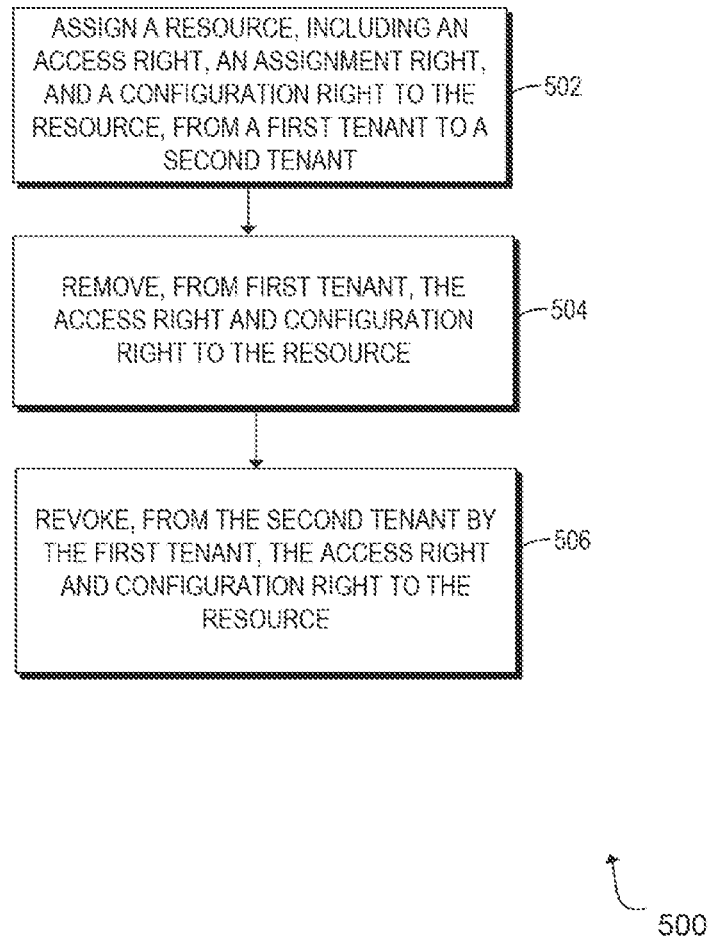
FIG. 5 is flowchart illustrating another example method for managing resources of a network device.

FIG. 4 and FIG. 5 are flowcharts illustrating example methods, 400 and 500 respectively, for managing resources of a network device. Execution of method 400 and method 500 is described below with reference to configuration manager 140 of FIG. 2; however, this is for explanatory purposes and other suitable components for execution of method 400 and/or method 500 may be utilized. Additionally, the components for executing method 400 and/or method 500 may spread among multiple devices. Method 400 and/or method 500 may be implemented in the form of executable instructions stored on a machine readable storage medium and/or in the form of electronic circuitry, e.g. hardware. In some examples, steps of method 400 and/or method 500 may be executed substantially concurrently or in a different order than shown in FIG. 4 and FIG. 5. In some examples, method 400 and/or method 500 may include more or less steps than are shown in FIG. 4 and FIG. 5. In some examples, some of the steps of method 400 and/or method 500 may, at certain times, be ongoing and/or may repeat.

At block 402, a resource of a network device, e.g. any of resources 121-125A of FIG. 2, may be assigned from a first capability database of a first tenant to a second capability database of a second tenant, e.g. capability database of Tenant A 210 and capability database of Tenant B 220 respectively. As described above with respect to FIG. 2, the first capability database may include a recorded capability of a resource assigned to a tenant of the first capability database, and may specifically include any number of rights to the resource, including an assignment right, an access right, and a configuration right to each resource, and/or any other rights for accessing, securing, or otherwise managing the resource. As further described above, assigning the right to the second tenant may include granting the second tenant any of the rights to the resource, including the access right, assignment right, configuration right, etc.

At block 404, the access right to the resource may be removed from the first capability database responsive to the assignment of the resource to the second capability database. In this way, the tenant of the first capability database may be isolated from the assigned resource. For example, with reference to FIG. 2, Bluetooth capability 132 may be assigned from capability database of Tenant A 210 to capability database of Tenant B 220. Responsive to this assignment, Bluetooth capability 132 may be removed from capability database of Tenant A 210, rendering Bluetooth capability 132 not accessible, not assignable, and not configurable by Tenant A.

Turning to FIG. 5, at block 502 a resource of a network device, e.g. any of resources 121-125A of FIG. 2, may be assigned from a first capability database of a first tenant to a second capability database of a second tenant. As described above with respect to FIG. 2, the first capability database may include a recorded capability of a resource assigned to a tenant of the first capability database, and may specifically include any number of rights to the resource, including an assignment right, an access right, a configuration right, and/or any other rights for accessing, securing, or otherwise managing the resource. As further described above, assigning the right to the second tenant may include granting the second tenant any of the rights to the resource, including the access right, assignment right, configuration right, etc. At block 504, the access right to the resource may be removed from the first capability database responsive to the assignment of the resource to the second capability database. In this way, the tenant of the first capability database may be isolated from the assigned resource.

As described above, Tenant A may assign capabilities of each resource to other tenant assignees, and these tenant assignees may enjoy isolated access to these resources. However, in some example implementations, Tenant A may maintain a right to revoke these resource assignments. At block 506, the access right and configuration right assigned at block 504 may be revoked from Tenant B by Tenant A. For example, capability 132 of Bluetooth 122 has been assigned to Tenant B and has thus been recorded at capability database of Tenant B 220. Tenant A may, via capability database of Tenant A 210, revoke capability 132 of Bluetooth 122 from capability database of Tenant B 220. In an example implementation, each of revocation rights 151-155A may be unassignable. In an example, the capabilities revoked from Tenant B are added back to the capability database of Tenant A 210, such that Tenant A may once again hold a configuration right, access right, etc., to the revoked resource capability.

Figure 6:
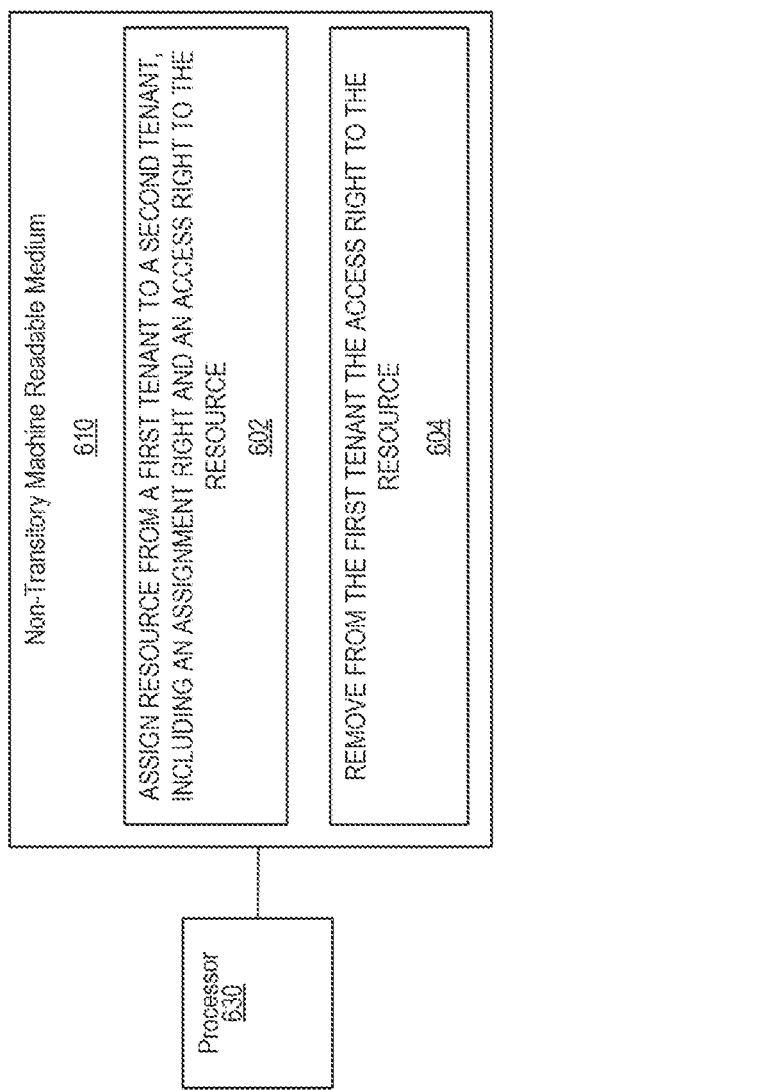
FIG. 6 is a block diagram including an example non-transitory machine readable medium for managing resources of a network device.
Figure 7:
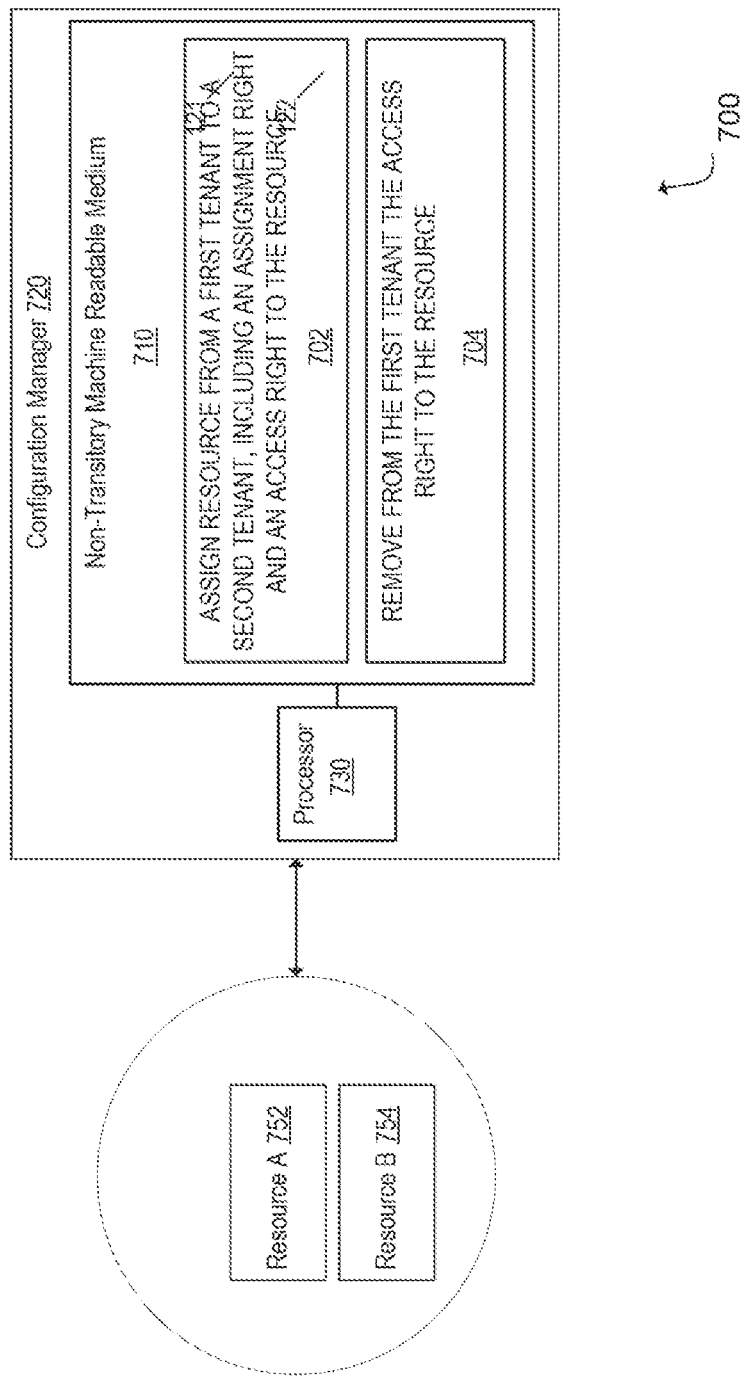
FIG. 7 is a block diagram of an example system including a configuration manager having a non-transitory machine readable medium for managing a network device.

FIG. 6 and FIG. 7 are block diagrams, 600 and 700 respectively, including example non-transitory machine readable mediums for managing resources of a network device. Non-transitory machine readable storage medium 610 of FIG. 6 may be coupled to a processor, e.g. processor 630, and non-transitory machine readable storage medium 710 of FIG. 7 may be coupled to a processor, e.g. processor 730, for managing network device resources. Non-transitory machine readable storage medium 610 and non-transitory machine readable storage medium 710 may include executable instructions thereon.

Non-transitory machine readable storage medium 610 (or non-transitory machine readable storage medium 710) may be implemented in a single device or distributed across devices. Likewise, processor 630 (or processor 730) may represent any number of physical processors capable of executing instructions stored by non-transitory machine readable storage medium 610 (or non-transitory machine readable storage medium 710). Further, non-transitory machine readable storage medium 610 (or non-transitory machine readable storage medium 710) may be fully or partially integrated in the same device as processor 630 (or processor 730), or it may be separate but accessible to that device.

For example, non-transitory machine readable medium 610 may be included as part of configuration manager 140 of FIG. 1, and thus may be integrated within network device 100. As another example, and as illustrated in FIG. 7, non-transitory machine readable medium 710 may be included as part of configuration manager 720, but separate from example network device 750. In other words, configuration manager 720 may be in communication with network device 750, e.g. over a network. Instructions of configuration manager 720 may manage resources of network device 750, e.g. resource A 752 and resource B 754, remotely.

In one example, the instructions may be part of an installation package that when installed can be executed by processor 610 (or processor 710) to manage network devices. In this case, non-transitory machine readable storage medium 610 (or non-transitory machine readable storage medium 710) may be a portable medium such as a floppy disk, CD, DVD, or flash drive or a memory maintained by a server from which the installation package can be downloaded and installed. In another example, the program instructions may be part of an application or applications already installed. Here, non-transitory machine readable storage medium 610 (or non-transitory machine readable storage medium 710) may include a hard disk, optical disk, tapes, solid state drives, RAM, ROM, EEPROM, or the like.

Processor 630 or 730 may be a central processing unit (CPU), graphics processing unit (GPU), microprocessor, and/or other hardware device suitable for retrieval and execution of instructions stored in non-transitory machine readable storage medium 610 (or non-transitory machine readable storage medium 710). Processor 630 may fetch, decode, and execute program instructions 602-604, and/or other instructions. Similarly, processor 730 may fetch, decode, and execute program instructions 702-704. As an alternative or in addition to retrieving and executing instructions, processor 630 may include at least one electronic circuit comprising a number of electronic components for performing the functionality of instructions 602-604, and/or other instructions. Similarly, processor 730 may include at least one electronic circuit comprising a number of electronic components for performing the functionality of instructions 702-704, and/or other instructions.

FIG. 6 is a block diagram 600 of an example system including a non-transitory machine readable medium 610. Non-transitory machine readable medium 610 may include instructions 602 to assign a resource of a network device, e.g. any of resources 121-125A of FIG. 2, from a first capability database of a first tenant to a second capability database of a second tenant. As described above with respect to FIG. 2, the first capability database may include a recorded capability of a resource assigned to a tenant of the first capability database, and may specifically include any number of rights to the resource, including an assignment right, an access right, and a configuration right to each resource, and/or any other rights for accessing, securing, or otherwise managing the resource. As further described above, assigning the right to the second tenant may include granting the second tenant any of the rights to the resource, including the access right, assignment right, configuration right, etc.

Non-transitory machine readable medium 610 may further include instructions 604 to remove the access right to the resource from the first capability database responsive to the assignment of the resource to the second capability database. In this way, the tenant of the first capability database may be isolated from the assigned resource as further described above.

FIG. 7 is a block diagram 700 of an example system including a configuration manager 720 in communication with a network device 750, and having a non-transitory machine readable medium 710. Non-transitory machine readable medium 710 may manage resources of network device 750, e.g. resource A 752 and resource B 754. Specifically, non-transitory machine readable medium may include instructions 702 to assign a resource of a network device, e.g. any of resources 121-125A of FIG. 2, from a first capability database of a first tenant to a second capability database of a second tenant. As described above with respect to FIG. 2, the first capability database may include a recorded capability of a resource assigned to a tenant of the first capability database, and may specifically include any number of rights to the resource, including an assignment right, an access right, and a configuration right to each resource, and/or any other rights for accessing, securing, or otherwise managing the resource. As further described above, assigning the right to the second tenant may include granting the second tenant any of the rights to the resource, including the access right, assignment right, configuration right, etc.

Non-transitory machine readable medium 710 may further include instructions 704 to remove the access right to the resource from the first capability database responsive to the assignment of the resource to the second capability database. In this way, the tenant of the first capability database may be isolated from the assigned resource as further described above.

In the foregoing description, numerous details are set forth to provide an understanding of the subject disclosed herein. However, Implementations may be practiced without some or all of these details. Other implementations may include modifications and variations from the details discussed above. It is intended that the appended claims cover such modifications and variations.

The invention claimed is:

1. A system comprising:
a configuration manager in communication with a network device including a first and second resource assigned to a first tenant, wherein the first and second resource are associated with a respective assignment right and access right to the first and second resource, the configuration manager including,
a processor; and
a memory storing instructions that, when executed by the processor, cause the processor to,
assign the first resource of the network device from the first tenant to a second tenant, wherein assigning the first resource to the second tenant includes granting the second tenant an assignment right and an access right to the first resource, and
remove the access right to the first resource from the first tenant such that the first tenant is isolated from the first resource.

2. The system of claim 1, wherein assigning the resource from the first tenant to the second tenant includes granting the second tenant a configuration right to the first resource.

3. The system of claim 2, wherein the instructions further cause the processor to remove a configuration right to the first resource from the first tenant.

4. The system of claim 3, further comprising a configuration aggregator to combine a configuration of the first tenant to the first resource and a configuration of the second tenant to the second resource, and apply the combined configuration to hardware of the network device associated with the first and second resource.

5. The system of claim 1, further comprising a data dispatches to transmit data associated with the first and second resource, wherein the first tenant is isolated from the first resource such that a data dispatcher does not transmit data associated with the first resource to the first tenant when the access right is assigned to the second tenant.

6. The system of claim 1, wherein the configuration manager further comprises a first capability database of the first tenant, and wherein removing the access right to the first resource from the first tenant further comprises removing the access right from the first capability database of the first tenant.

7. The system of claim 6, wherein the configuration manager further comprises a second capability database of the second tenant, and wherein granting the access right and the assignment right to the second tenant further comprising adding the assignment right and access right of the first resource to the second capability database of the second tenant.

8. The system of claim 1, wherein the first and second resource may include any one of, a short-wavelength UHF radio wave channel, an Ethernet port, and a radio capable of broadcasting a Service Set Identifier (SSID).

9. The system of claim 1, wherein the first or second resource is an internet of things (IoT) device in communication with the network device.

10. A method to be executed by a processor, the method comprising:
assigning, from a first capability database of a first tenant to a second capability database of a second tenant, a resource of a network device from the first tenant to the second tenant, wherein the first capability database includes an assignment right, an access right, and a configuration right to each resource, and wherein assigning the resource to the second tenant includes granting the second tenant an access right to the assigned resource; and
responsive to the assignment of the first resource, removing, from the first capability database of the first tenant; the access right to the resource such that the first tenant is isolated from the resource.

11. The method of claim 10, wherein the first capability database further includes a revocation right to each resource.

12. The method of claim 11, further comprising revoking, via the first capability database, the access right to the resource from the second capability database.

13. The method of claim 10, wherein assigning the resource to the second tenant further includes granting the second tenant an assignment right and a configuration right to the assigned resource.

14. The method of claim 10, wherein the resource may include any one of, a short-wavelength UHF radio wave channel, an Ethernet port, and a radio capable of broadcasting a Service Set Identifier (SSID).

15. A non-transitory machine readable medium comprising instructions executable by a processor to:
assign, by a configuration manager, a first resource of a network device from a first tenant to a second tenant, wherein the network device includes a first and second resource of the first tenant, the first and second resource associated with a respective assignment right and access right to the first and second resource, and wherein assigning the first resource to the second tenant includes granting the second tenant an assignment right and an access right to the resource; and
responsive to the assignment of the first resource, remove, by the configuration manager, the access right to the resource by the first tenant such that the first tenant is isolated from the resource.

16. The non-transitory machine readable medium of claim 15, further comprising instructions to remove the assignment right and access right to the first resource from a first capability database of the first tenant.

17. The non-transitory machine readable medium of claim 16, further comprising instructions to add the assignment right and access right to the first resource to a second capability database of the second tenant.

18. The non-transitory machine readable medium of claim 15, wherein the first resource and the second resource are further associated with a respective configuration right, and further comprising instructions to remove a configuration right to the first resource from a first capability database of the first tenant, and adding the configuration right to the first resource to a second capability database of the second tenant.

19. The non-transitory machine readable medium of claim 15, wherein a first capability database of the first tenant includes a revocation of assignment right to the first and second resource.

20. The non-transitory machine readable medium of claim 15, wherein the first and second resource may include any one of, a short-wavelength UHF radio wave channel, an Ethernet port, an internet of things (IoT) device in communication with the network device, and a radio capable of broadcasting a Service Set Identifier (SSID).

* * * * *